United States Patent [19]
Leivian et al.

[11] Patent Number: 5,897,627
[45] Date of Patent: Apr. 27, 1999

[54] METHOD OF DETERMINING STATISTICALLY MEANINGFUL RULES

[75] Inventors: Robert H. Leivian, Chandler; Robert M. Gardner, Gilbert, both of Ariz.

[73] Assignee: Motorola, Inc., Schaumuburg, Ill.

[21] Appl. No.: 08/859,450

[22] Filed: May 20, 1997

[51] Int. Cl.[6] .................................................. G06F 15/18
[52] U.S. Cl. ............................................... 706/12; 706/16
[58] Field of Search ................................. 706/25, 38, 12, 706/16

[56] References Cited

U.S. PATENT DOCUMENTS

| | | | |
|---|---|---|---|
| 5,210,868 | 5/1993 | Shimada et al. | 364/259 |
| 5,396,580 | 3/1995 | Fu | 706/12 |
| 5,687,286 | 11/1997 | Bav-Yam | 706/20 |
| 5,720,007 | 2/1998 | Hekmatpour | 706/50 |
| 5,724,573 | 3/1998 | Agrawal et al. | 707/61 |

*Primary Examiner*—Robert W. Downs
*Attorney, Agent, or Firm*—Eugene A. Parsons

[57] ABSTRACT

A method including providing a database with a plurality of items, each item having several attributes, and developing and displaying a cluster map (SOM) attribute plane from the items and attributes, including clusters of items having similar attributes. Selecting an attribute of interest and splitting the plurality of items into clusters of interest based on distribution of the selected attribute. Utilizing rule induction to provide a rule for each cluster of interest, drawing a line around adjacent items in the SOM attribute plane for each rule to form at least one complete fenced area in the display, and comparing fenced areas to clusters to separate statistically meaningful rules from statistically meaningless rules or coincidences.

20 Claims, 5 Drawing Sheets

```
╔══════════════ CLUSTER RULE ANALYSIS ══════════════╗
CLUSTERS: 12  RULES: 399 (COVERS 16478 OF 17246)  ORPHANS: 0
  ▷ C6,  3 RULES COVERS  46 OF  49 ITEMS  93% (ERRORS:0)
  ▷ C7,  4 RULES COVERS  64 OF  65 ITEMS  98% (ERRORS:3)
  ▷ C0,  4 RULES COVERS  00 OF  80 ITEMS 100% (ERRORS:0)
  ▷ C5,  6 RULES COVERS  62 OF  64 ITEMS  96% (ERRORS:1)
  ▷ C2, 12 RULES COVERS 363 OF 364 ITEMS  99% (ERRORS:2)
  ▷ C4,  5 RULES COVERS 111 OF 113 ITEMS  98% (ERRORS:4)
  ▷ C9,  5 RULES COVERS 137 OF 140 ITEMS  97% (ERRORS:7)
  ▽ C1,  5 RULES COVERS 243 OF 244 ITEMS  99% (ERRORS:7)
  ▽       1 RULE 680 (9.75) COVERS: 48% (120/1)
          MATERIAL LOT=G5749.1W
  ▷       2 RULE 586 (9.53) COVERS: 13% (34/0)
  ▷       3 RULE 498 (9.52) COVERS:  3% (8/0)
  ▷       4 RULE 716 (9.47) COVERS: 22% (56/11)
  ▷       5 RULE 520 (9.06) COVERS:  3% (8/0)
  ▷       6 RULE 584 (9.06) COVERS:  1% (4/0)
  ▷       7 RULE 591 (8.58) COVERS:  6% (20/5)
  ▽ MISC. L0, 53 RULES COVERS 716 OF 739 ITEMS 96% (ERROR:12)
  ▽       1 RULE 722 (9.72) COVERS: 19% (56/0)
          MATERIAL LOT=G60354.1Y
          Y0320 RUN=R3521
  ▷       2 RULE 732 (9.72) COVERS: 19% (56/0)
  ▷       3 RULE 734 (9.61) COVERS: 13% (40/0)
  ▷       4 RULE 557 (9.52) COVERS: 10% (32/0)
  ▷       5 RULE 689 (9.52) COVERS:  5% (16/0)
  ▷       6 RULE 695 (9.36) COVERS:  7% (23/0)
  ▷       7 RULE 650 (8.77) COVERS: 21% (72/8)
  ▷       8 RULE 641 (7.19) COVERS:  1% (7/3)
  ▷ HI, 139 RULES COVERS 3751 OF 3973 ITEMS 94% (ERRORS:83)
  ⊠ CONSIDER DUPLICATES WHEN FINDING MATCHES
  [READ RULES]        [FIND MATCH]        [CLOSE]
```

*FIG. 5*

METHOD OF DETERMINING STATISTICALLY MEANINGFUL RULES

FIELD OF THE INVENTION

This invention relates to a computer method of displaying the results and the quality of match of rules derived by Rule Induction of clusters formed by a Cluster Map neural network.

BACKGROUND OF THE INVENTION

SOM (self organizing maps) neural networks are known to be able to self-organize clusters of items based on similarity of their attributes, but it is not easy to understand the rational behind how the clusters are formed. Rule induction (RI) can find common attributes among clusters and derive rules that can be used to define the clusters, but you must have meaningful clusters to find meaningful rules, otherwise rule induction just finds contrived or coincidental relationships and useless or statistically meaningless rules.

Rule induction works very well in finding rules to define clusters in the case where the underlying relationships are basically from a single cause. However, when there are multiple interrelated underlying reasons acting in combination, rule induction has trouble finding the rules and generally derives very poor rules. However to evaluate the quality of rules takes a detailed review by a human expert and is very time consuming and error prone.

SOM networks can generally break down the multiple relationships into separate clusters and derive distinct groups that have a single attribute, say low performance, in common but this low performance is generally caused by several distinct 'paths' or combination of other factors. However to evaluate the reasons behind these clusters, especially if many dozens or even hundreds of factors have been input into the SOM, takes a detailed review by a human expert and is very time consuming and error prone.

Hence there is a need for quickly showing the degree or match of rules between the items and the membership in each cluster of a SOM.

It is a purpose of the present invention to provide a new and improved computer implemented method of determining statistically meaningful rules.

It is another purpose of the present invention to provide an automated method to use SOMs to define clusters and rule induction to define rules among these clusters.

It is still another purpose of the present invention to provide an automated method to use SOMs to define clusters and rule induction to define rules among these clusters so as to find patterns and relationships, that neither could find on its own and to determine if the derived rules are statistically meaningful or are merely an artifact of the sample of items chosen to evaluate, i.e. statistically meaningless.

SUMMARY OF THE INVENTION

The above problems and others are at least partially solved and the above purposes and others are realized in a computer implemented method of determining statistically meaningful rules including the steps of providing a database having stored therein a plurality of attributes pertaining to a plurality of items, each item having more than one attribute, and developing and displaying a self-organizing map attribute plane from the plurality of attributes and the plurality of items in the database. The self-organizing map attribute plane includes clusters of items with similar attributes. Rule induction is utilized to define rules representative of a plurality of attributes of selected clusters of items and statistically meaningful rules are selected from statistically meaningless rules or coincidences, utilizing the rules and clusters.

The above problems and others are at least partially solved and the above purposes and others are further realized in a method of delineating cells defined by a selected rule including the steps of providing a database including a plurality of items, each item having a plurality of attributes, developing a self-organizing map attribute plane from the plurality of items and the plurality of attributes in the database and displaying the self-organizing map attribute plane. The self-organizing map attribute plane includes a plurality of cells with each cell including at least one item. A rule of interest is applied to each item, and the closest cell for that item is selected from the self-organizing map attribute plane to determine if the cell contains an item that comes within the rule. When a specific cell being processed comes within the specific rule, the specific rule of interest is applied to a cell adjacent to the specific cell to determine if the adjacent cell contains an item that comes within the specific rule. If the specific rule does not apply to the adjacent cell, a line is drawn between the specific cell and the adjacent cell. If the specific rule does apply to the adjacent cell, no line is drawn between the specific cell and the adjacent cell and the process goes on to the next cell to be processed. The last three steps are repeated until each cell has been considered and lines are drawn around adjacent cells in the self-organizing map attribute plane for the selected rule to form complete fenced areas in the self-organizing map attribute plane.

BRIEF DESCRIPTION OF THE DRAWINGS

Referring to the drawings:

FIG. 3 is an illustration of a self-organizing map attribute plane as seen on a computer display or the like;

FIG. 5 illustrates a rule select/deselect dialog box associated with the self-organizing map attribute plane of FIG. 3;

DESCRIPTION OF THE PREFERRED EMBODIMENT

Figure 1:
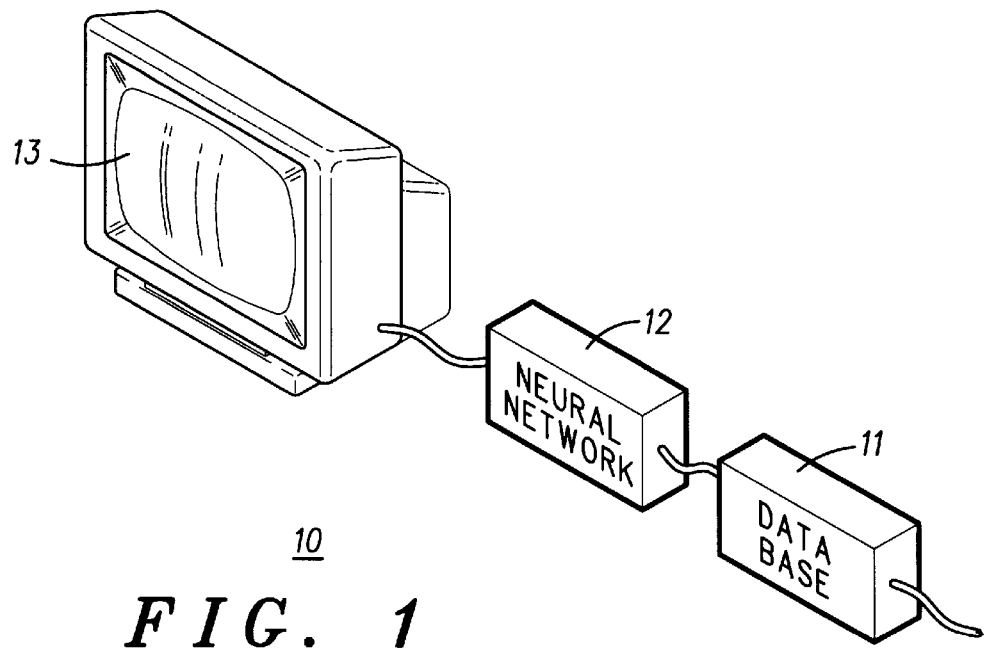
FIG. 1 is a simplified block diagram of a computer implementation for use in a method of determining statistically meaningful rules in accordance with the present invention

Turning now to the drawings, FIG. 1 is a simplified block diagram of a computer workstation 10, which provides an implementation for a method of determining statistically meaningful rules in accordance with the present invention. The simplified computer workstation 10 of FIG. 1 includes a database 11 which is constructed to store data including a plurality of rules pertaining to a plurality of items. Generally, each item has a plurality of attributes, all of which are stored in database 11. Data is retrieved from database 11 and applied to a neural network 12 for the appropriate operations, e.g. training neural network 12 such that items having similar attributes are assigned to a neighborhood of neurons in neural network 12, matching the neurons of neural network 12 with the attributes from database 10, and storing matches in a first cross reference table and displaying the table on a display 13.

Figure 2:
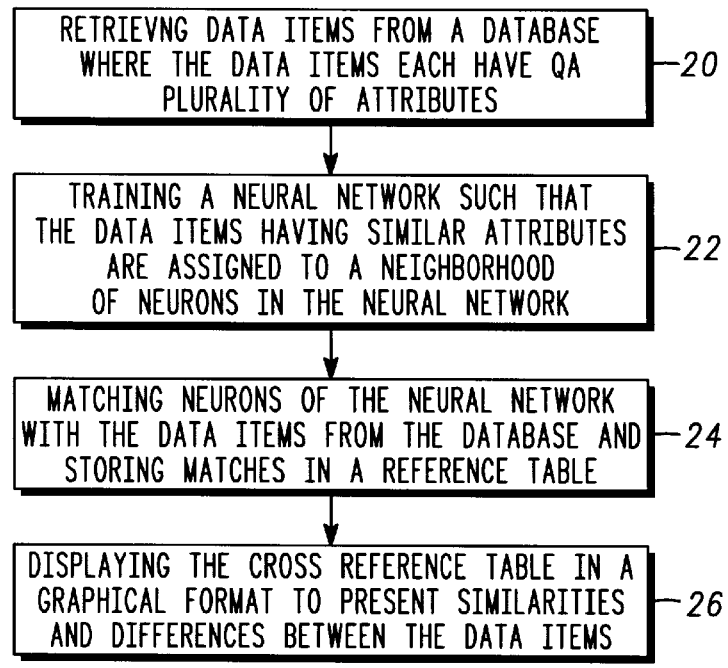
FIG. 2 is a flowchart illustrating a method of organizing data into a graphically oriented format.

The process steps of FIG. 2, as illustrated and explained herein, are implemented by computer software operating on a computer system such as personal workstation 10, illustrated in simplified form in FIG. 1. The computer system with its processor, memory and coding provide a means of performing the illustrated steps. In one embodiment, the process is completely encoded in software. A hardware implementation such as a neural network, a Sammon map, or any other linear and non-linear mapping system that projects data from N-dimensional space to 2-dimensional space is used in conjunction with the software to accelerate the computational processing. While a self-organizing map is used in this preferred embodiment to cluster items into a cluster map, it should be understood that cluster maps can be created in any of a variety of methods including K-Means/Sammon Mapping, curvilinear component analysis, and other statistical approaches.

In the specific database example, each item of the database is systematically retrieved from the database, converted to an input signal vector, and applied to a neural network for training, see step 20 of FIG. 1. The process continues over time with the plasticity getting smaller and the neighborhood getting smaller each cycle until the neurons of neural network 12 organize to the information in database 11, see step 22 in FIG. 1. At the conclusion of training, the plasticity is approximately zero and the neighborhood is only the winning neuron or just its immediate neighbors. Neural network 12 is organized such that items with similar attribute data are organized adjacent to one another in the same neighborhood of neurons. Items that are different are assigned to neurons located some distance away. Various hardware implementations of changing the synapses and plasticity are described in U.S. Pat. Nos. 5,067,095, 5,097,141, and 5,216,751.

Once neural network 12 is organized and fully trained, then each item is retrieved from database 11 in random order and applied to neural network 12. One neuron will be the closest match with the data item as described in step 24 of FIG. 2. The winning neuron that matches with the item is stored in a cross reference table, which may be in a portion of database 11 or contained in display 13.

In step 26 of FIG. 2, the cross reference table is displayed on a computer screen, e.g. display 13, as graphical color clusters of the various items. Generally, it is desirable for efficient visual determinations to differentiate the various clusters by some identifying visual characteristic, such as color, various gray scales, etc. Items with similar attributes are located in the same neighborhood, i.e. close to one another, while items with dissimilar attributes are located some distance away depending on the degree of dissimilarity. The cross reference table in software that relates neurons to items becomes a well defined topological organization of the data in database 11 with items having similar attribute data grouped together, i.e. in the same neighborhood of neurons, and items with different attribute data located some distance away, as seen in the computer screen of FIG. 3.

The above described method of organizing data into a graphically oriented format, hereafter referred to as a self-organizing map (SOM) attribute plane is described in more detail in a copending United States Patent Application entitled "Method of Organizing Data into a Graphically Oriented Format", U.S. Ser. No. 08/523,326, filed on Sep. 5, 1995 and assigned to the same assignee.

Figure 3:
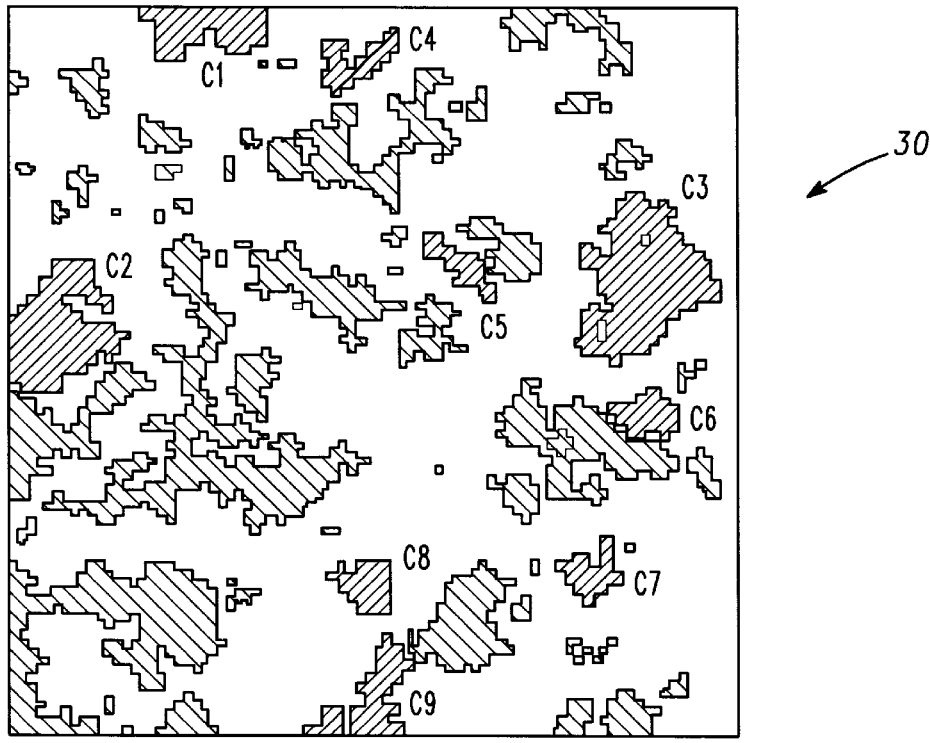

Turning now to FIG. 3, a self-organizing map attribute plane 30 is illustrated as seen, for example, on computer display 13 of FIG. 1. SOM attribute plane 30 is developed from a specific example in which information from over 17 thousand wafers from a wafer fabrication plant and 130 different attributes of the wafers was stored in database 11. For example, the identifying information for each wafer of the 17 thousand wafers occupied a row of a matrix and each attribute of the 130 attributes occupied a column. Generally, with the power and size of the system utilized, the number of attributes that can be considered is in a range of 10 to 200 attributes. Here it should be noted that traditional multi-variant analysis typically can only handle 4 or 5 attributes.

Figure 4:
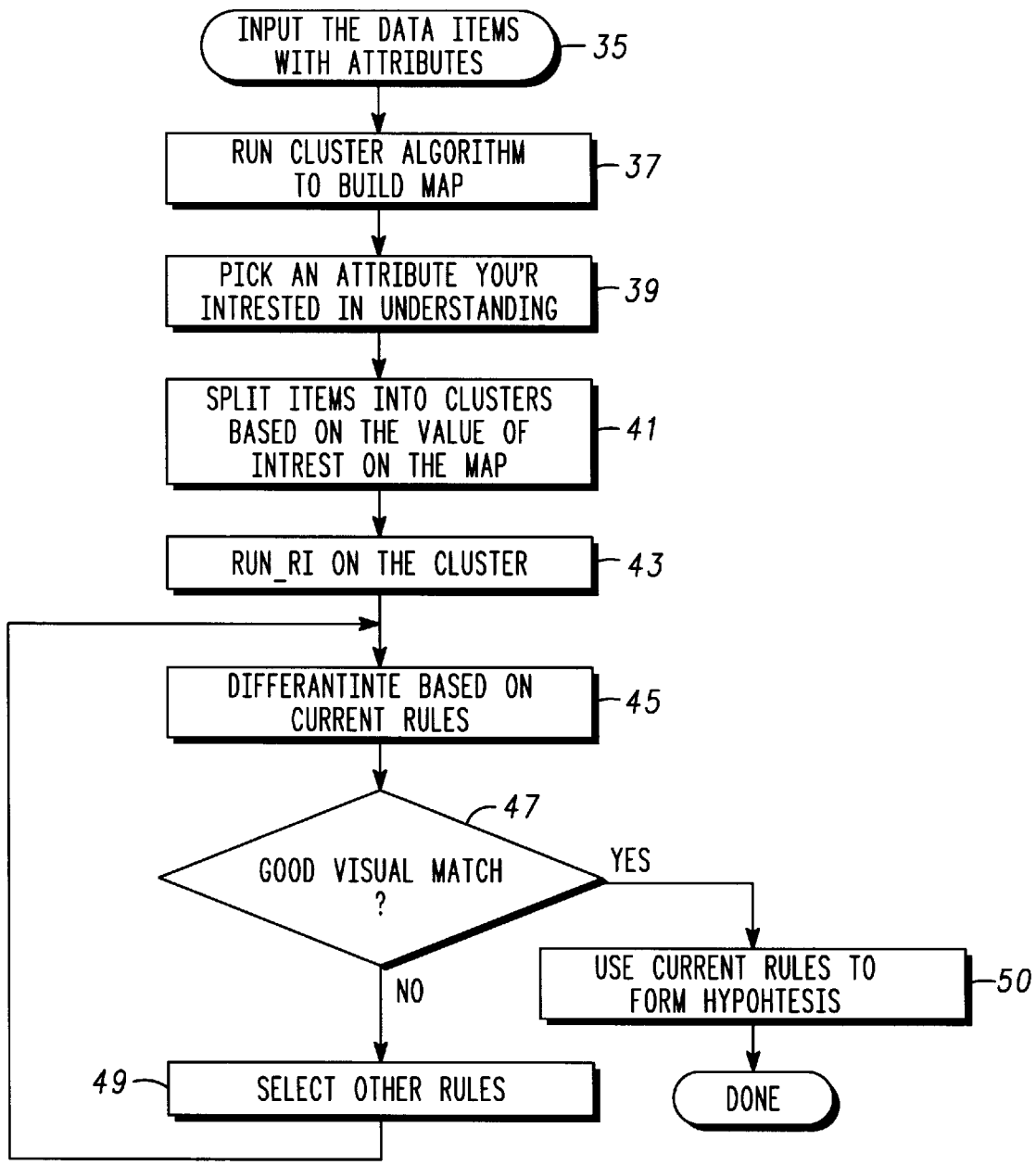
FIG. 4 is a flowchart illustrating a method of procedure in accordance with the present invention.

Turning now to FIG. 4, a flowchart illustrates a computer implemented method of determining statistically meaningful rules in accordance with the present invention. A first step 35 in the method includes providing a plurality of items, each of which has a plurality of attributes. As explained above, in this specific example, identification of the items and the various attributes are stored in database 11. A next step 37 in the process is to run a self-organizing maps program to develop SOM attribute plane 30. Referring to FIG. 3, attribute plane display 30 from a SOM network is illustrated, where a fixed two dimensional (2D) grid of cells that is the 'map' of a SOM, has organized a given set of items representing points in Nspace into 2space. An attribute plane is the result of mapping a single attribute of the input items though the map and displaying an identifying visual characteristic (e.g. a color code) in each mapped cell that corresponds to the value of the selected attribute. There are N such attribute planes (one for each of the N attributes of the input items).

Referring again to FIG. 4, a next step 39 includes selecting an attribute of interest which the operator wants to understand. In the present example the attribute of interest which was selected is 'yield' (i.e. percentage of good die per wafer). In FIG. 3 SOM attribute plane 30 represents the attribute 'yield' of a set of items that consist of semiconductor wafers (17 thousand) produced from a given production line and N (130) attributes of each wafer (such as yield, contact resistance, transistor beta, etc. as well as production attributes such as which machine was used for each production step, operator name of those involved, time that each step was performed, humidity, etc.). The color code was such that red indicates that the wafer was a low yielding wafer, blue is average yield, and green is higher yield (in FIG. 3 the color code is represented by different cross hatch or lack thereof).

Referring again to FIG. 4, a next step 41 includes selecting clusters based on values of the selected attribute of interest. In the present example, the attribute of interest is 'yield' and the values are separated into ranges defined as low, average and high. As can be seen in FIG. 3, there are three large and several smaller clusters of low yield wafers, designated C1 through C9. The SOM has produced SOM attribute plane 30 in an unsupervised learning method described above. SOM attribute plane 30 shows that there are at least three major distinct reasons for low yield, six minor reasons (represented by the larger of the areas C1 through C9), and various random reasons as illustrated by the tiny random clusters and therefore, it is unlikely that there is a single cause in the other attributes. Conventional rules induction run on this data with all the low yield wafers unclustered will not produce any statistically meaningful rules that identify the cause of the low yield.

However, using SOM attribute plane 30 and the spatial relationship it is easy to separate the low yield wafers into three clusters, based on the contiguous neighborhood of the red areas of SOM attribute plane 30. Referring again to FIG. 4, a next step 43 includes running rules induction on the clusters of interest based on distribution of the selected attribute. With the low yield wafers broken into separate clusters rule induction was able to find more meaningful rules since the multiple causal relationships were broken apart before rules induction was attempted. Because of this, rule induction was able to do what it does best, find simple relationships to explain each cluster.

Turning to FIG. 5, a typical display of a dialog box loaded with the rules produced by rule induction is illustrated. This dialog box is loaded with the rules produced by rule induction and set into a hierarchical list with each cluster having a line in the list, under each line for the cluster there is one line for each rule that defines that cluster, and under each rule there is one line for each condition that is needed to be met for that rule. A right/down arrow is illustrated that will expand or contract the subservient lines in an outline type display, as will be understood by those skilled in the art. Using this display, it is possible to prune unnecessary or redundant rules during subsequent operations.

Figure 6:
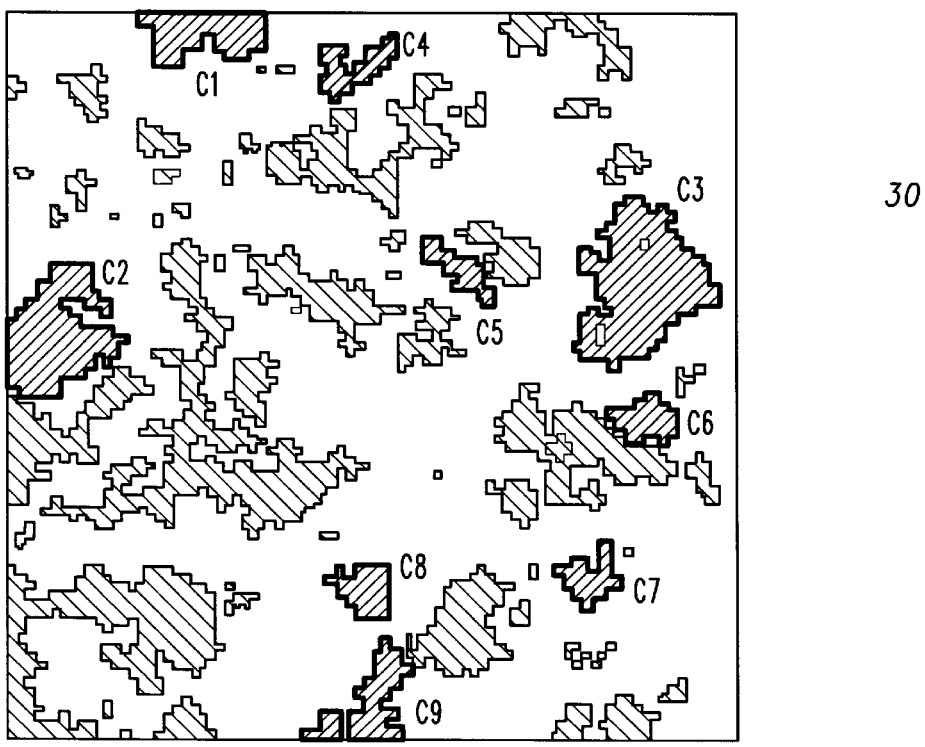
FIG. 6 illustrates a self-organizing map attribute plane with good meaningful rule induction fences.

Returning to FIG. 4, a next step 45 includes a process of delineating or differentiating certain areas of SOM attribute plane 30, such as drawing fences around areas based on selected rules, overlaying contrasting color shading, etc. Turning to FIG. 6. SOM attribute plane 30 is illustrated with rules induction 'fences' added in an overlay display (clusters outlined in dark lines). These fences are produced by taking each item, in this case the semiconductor wafers, and classifying the wafer into categories by the rules produced by rule induction. These rules consist of simple 'AND' and 'OR' Boolean operation on the attributes. For example, a wafer is in cluster 'low cluster 1' if the material equals lot XYZ and the EPI machine equals #123, or if the material equals lot ABC and the contact resistance is greater than X.

Here it should be noted that SOM attribute plane 30 is composed of a plurality of cells which make up the display or map. Each cell of interest contains one or more items from the information supplied by database 11. Since each wafer has been categorized into clusters, SOM attribute plane 30 can be used to find the cell in the map that is the closest match for each wafer by computing the distance (either by Euclidean or Manhattan Nspace geometry) from this point in Nspace (defined by the N attributes of that wafer) to each Nspace point in the map and finding the minimum distance (exact ties are broken arbitrarily) and then assigning that closest cell to the same cluster as the wafer. This is done for each wafer in the input set. Therefore each cell in the map is assigned to one of the three low yield clusters or if unassigned it is assigned to the 'other' cluster.

A program then draws the fences according to the following algorithm:

1) each cluster is assigned an identifying visual characteristic (in this example, a unique color distinct from the colors of SOM attribute plane 30, such as primary colors for the attribute plane and pastels for the fences);

2) a loop is set up to process each cell in row major (varying column first then rows) order;

3a) if a specific cell is not in the 'other' cluster, an adjacent cell (e.g. an adjacent cell in the same row, such as its 'east' neighbor) is considered, if the adjacent cell is not in the same cluster as the specific, a line is drawn between the cells in the color of the specific cell's cluster;

3b) if the specific cell is in the 'other' cluster, an adjacent cell (e.g. its east neighbor) is considered, if it is in some 'non-other' cluster a line between the cells is drawn in the color of that cluster;

3c) otherwise no line is drawn; and 4) steps 3a–3c are repeated for each cell with, for example, an adjacent cell in an another row, such as the 'south' neighbor cell instead of the 'east'. The final three steps (3a–3c) are repeated until lines are drawn around adjacent cells in SOM attribute plane 30 for each selected rule to form complete fenced areas, as illustrated in FIG. 6. It should be noted that because of symmetries only two of the eight possible neighbors (e.g. east and south) need to be considered.

Figure 7:
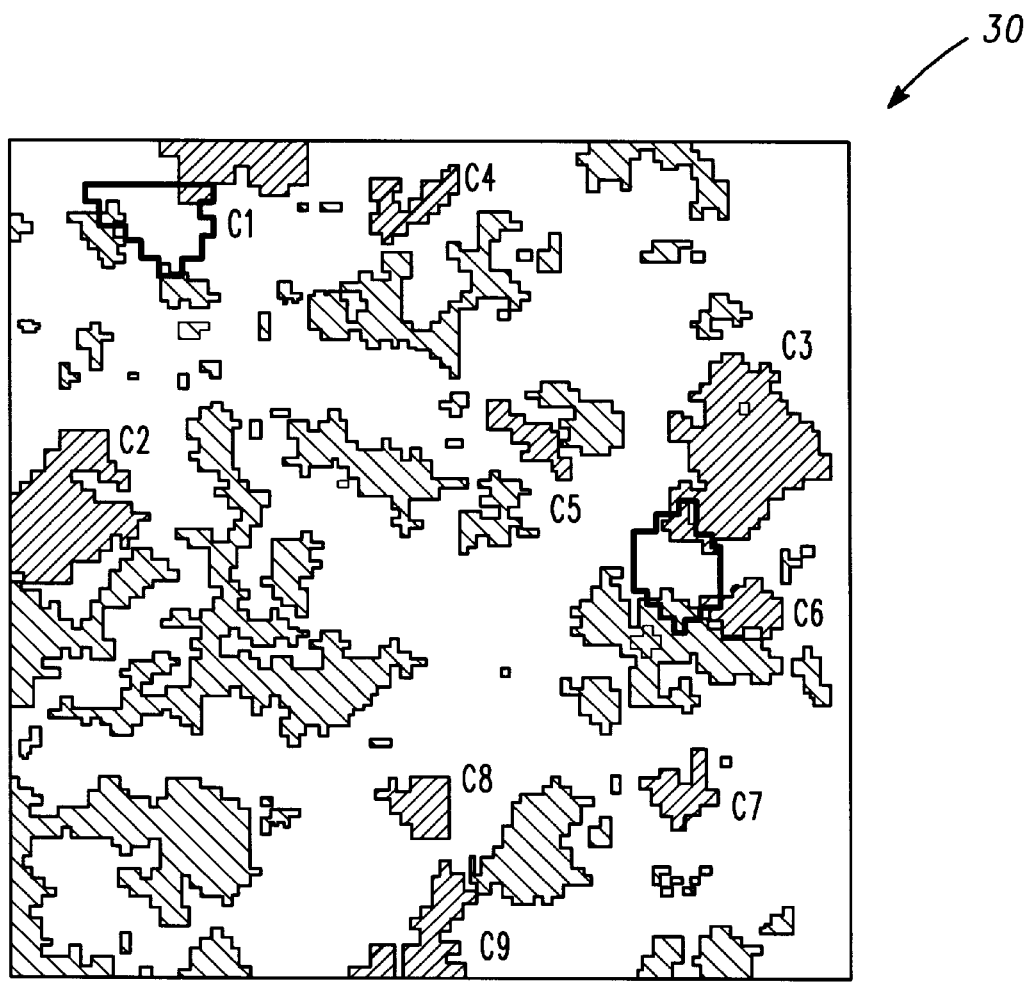
FIG. 7 illustrates a self-organizing map attribute plane with meaningless rule induction fences.

This results in all contiguous cells of the same cluster being enclosed in fences of the appropriate color. A quick visual reference is then provided to provide feedback on how well the fences correlate with the attribute. Also once the rule induction fences have been established, you can quickly look at SOM attribute planes of other attributes with this same fence arrangement and find any other attributes that correlate with this one. FIG. 6 is an example of a good correlation, while FIG. 7 illustrates an example of rule induction fences that are unrelated to the given attribute. A decision step 47 in FIG. 4 is the determination of whether there is a good visual match between the fences and the selected clusters. If there is not a good visual match the process returns to step 45 and new rules are selected, designated box 49. It is also possible to prune unnecessary or redundant rules and recompute the fences interactively.

As explained above, the right/down arrow will expand or contract the subservient lines in the outline type display of FIG. 5. The operator can click on the right/down arrow to toggle it to right or down from its current state and expand or contract the detail in the list. The operator can click on a cluster, rule, or condition and add or remove (it is grayed out if the rule is not currently included for consideration) that item from consideration and push the 'find match' button and recompute the fences based only on the currently selected items. It is easy to see how much effect each rule has on how well the fences match the attribute values as the fences are redrawn overlaying SOM attribute plane 30.

Once the most meaningful rules that correlate best with the low yield are found, the attributes found by reviewing the rules are used to hypothesize the reason for the low yield and perform experiments to correct or alter the identified problem, indicated by box 50 in FIG. 4. In the above specific example, the low yield attribute was selected and reasons for the low yield were found and rectified. This has proved to be easy for experts to do once the meaningful two or three attributes (out of the hundreds of possible candidates) have been identified.

Hence, what has been provided is a novel computer method of combining a SOM to break down multiple factor attributes into clusters and rule induction to produce the rules that explain and define the clusters and a quick and easy method to visually verify meaningful rules. This allows an operator to form a hypothesis for the cause of complicated failure modes, which hypothesis is not possible by any of the current state-of-the-art methods by themselves.

Briefly stated, a specific method of combining cluster mapping and rules induction with a graphic 'attribute plane' display that uses identifying visual characteristics, such as colors, to represent the clusters and bordered fences is described to show the extent of the rule defined membership of each item. In the example of using colors as the identifying visual characteristic, when the 'fences' enclose the colored blobs of each cluster, for example, whether the rules are statistically meaningful can be quickly determined. If the fences enclose many colors the rules are statistically meaningless or coincidence. Also disclosed is a method for listing a complete set of rules and the estimated coverage of each rule in an expandable list. Individual rules can be enabled and disabled and the fences can be redrawn based on a selected subset of rules. This allows redundant or conflicting rules to be quickly pruned.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A computer implemented method of determining statistically meaningful rules comprising:

providing a database including a plurality of attributes pertaining to a plurality of items, each item having more than one attribute;

developing a cluster map attribute plane from the plurality of attributes and the plurality of items in the database, the cluster map attribute plane including clusters of items with similar attributes and displaying the cluster map attribute plane;

utilizing rule induction to define rules representative of a plurality of attributes of selected clusters of items; and utilizing the rules and clusters, selecting statistically meaningful rules from statistically meaningless rules or coincidences.

2. A computer implemented method of determining statistically meaningful rules as claimed in claim 1 wherein the step of developing and displaying a cluster map attribute plane includes the steps of retrieving items from the database, where the items each have a plurality of attributes, training a neural network such that items having similar attributes are assigned to a neighborhood of neurons in the neural network, matching the neurons of the neural network with the items from the database and storing matches in a first cross reference table, and displaying the first cross reference table in a graphical format to present similarities between the items.

3. A computer implemented method of determining statistically meaningful rules as claimed in claim 2 wherein the step of training includes the steps of applying elements of an input signal vector representing the plurality of attributes of one of the data items to the neurons of the neural network, identifying one of the neurons as having synapses that are most closely matched to the elements of the input signal vector, and adjusting the synapses of the one of the neurons to more closely match the elements of the input signal vector according to a predetermined learning rule.

4. A computer implemented method of determining statistically meaningful rules as claimed in claim 1 wherein the step of utilizing rule induction includes the steps of selecting an attribute of interest, selecting clusters of items within a range of values of interest from the cluster map attribute plane, with each cluster including a plurality of items each having the selected attribute, and developing sets of rules for each selected cluster of items.

5. A computer implemented method of determining statistically meaningful rules as claimed in claim 1 including in addition a step of using the selected statistically meaningful rules to alter the attribute of interest.

6. A computer implemented method of determining statistically meaningful rules as claimed in claim 1 wherein the step of selecting statistically meaningful rules includes the steps of:

selecting a plurality of clusters of items, each cluster having a defining rule;

assigning each selected cluster an identifying visual characteristic;

applying the defining rules of the selected clusters to each cell in the cluster map attribute plane in row major order to determine if the cell contains an item that comes within a defining rule;

when a specific cell being processed comes within a specific defining rule, applying the specific defining rule of the selected clusters to a cell adjacent to the specific cell to determine if the adjacent cell contains an item that comes within the specific defining rule; and if the specific defining rule does not apply to the adjacent cell, drawing a line between the specific cell and the adjacent cell in the identifying visual characteristic of the specific cell's cluster.

7. A computer implemented method of determining statistically meaningful rules as claimed in claim 6 wherein the final three steps are repeated until all items are considered and lines are drawn around adjacent cells in the cluster map attribute plane for each selected rule to form complete fenced areas in the cluster map attribute plane.

8. A computer implemented method of determining statistically meaningful rules as claimed in claim 7 wherein the cells in the cluster map attribute plan are arranged in columns and rows and the step of applying the specific defining rule of the selected clusters to a cell adjacent to the specific cell includes applying the specific defining rule of the selected clusters to an adjacent cell in the same row and applying the specific defining rule of the selected clusters to an adjacent cell in an adjacent row.

9. A computer implemented method of determining statistically meaningful rules as claimed in claim 7 including in addition a step of comparing fenced areas to clusters to separate statistically meaningful rules from statistically meaningless rules or coincidences.

10. A computer implemented method of determining statistically meaningful rules as claimed in claim 6 wherein the step of assigning each selected cluster an identifying visual characteristic includes assigning each selected cluster an identifying color in a color display.

11. A computer implemented method of determining statistically meaningful rules comprising:

providing a database including a plurality of items, each item having a plurality of attributes;

developing a cluster map attribute plane from the plurality of items and the plurality of attributes in the database and displaying the cluster map attribute plane, the displayed cluster map attribute plane including a plurality of clusters of items with each item in a cluster having at least one attribute similar to all other items in the cluster;

selecting an attribute of interest and selecting clusters of interest within a range of values of interest from the cluster map attribute planes;

utilizing rule induction to provide a rule for each cluster of interest;

differentiating adjacent items in the cluster map attribute plane for each rule to form at least one differentiated area in the display; and comparing differentiated areas to clusters to separate statistically meaningful rules from statistically meaningless rules or coincidences.

12. A computer implemented method of determining statistically meaningful rules as claimed in claim 11 wherein the cluster map attribute plane includes a plurality of cells each including at least one item and the step of differentiating adjacent items includes the steps of:

assigning each cluster of interest an identifying visual characteristic;

applying the rules of the clusters of interest to each cell in the cluster map attribute plane in row major order to determine if the cell contains an item that comes within a rule;

when a specific cell being processed comes within a specific rule, applying the specific rule of the clusters of interest to a cell adjacent to the specific cell to determine if the adjacent cell contains an item that comes within the specific rule; and if the specific rule does not apply to the adjacent cell, drawing a line between the specific cell and the adjacent cell in the identifying visual characteristic of the specific cell's cluster.

13. A computer implemented method of determining statistically meaningful rules as claimed in claim 12 wherein the final three steps are repeated until lines are drawn around adjacent cells in the cluster map attribute plane for each selected rule to form complete fenced areas in the cluster map attribute plane.

14. A computer implemented method of determining statistically meaningful rules as claimed in claim 13 wherein the cells in the cluster map attribute plan are arranged in columns and rows and the step of applying the specific defining rule of the selected clusters to a cell adjacent to the specific cell includes applying the specific defining rule of the selected clusters to an adjacent cell in the same row and applying the specific defining rule of the selected clusters to an adjacent cell in an adjacent row.

15. A computer implemented method of determining statistically meaningful rules as claimed in claim 11 wherein the step of developing and displaying a cluster map attribute plane includes the steps of retrieving items from the database, where the items each have a plurality of attributes, training a neural network such that items having similar attributes are assigned to a neighborhood of neurons in the neural network, matching the neurons of the neural network with the items from the database and storing matches in a first cross reference table, and displaying the first cross reference table in a graphical format to present similarities between the items.

16. A computer implemented method of determining statistically meaningful rules as claimed in claim 15 wherein the step of training includes the steps of applying elements of an input signal vector representing the plurality of attributes of one of the data items to the neurons of the neural network, identifying one of the neurons as having synapses that are most closely matched to the elements of the input signal vector, and adjusting the synapses of the one of the neurons to more closely match the elements of the input signal vector according to a predetermined learning rule.

17. A computer implemented method of determining statistically meaningful rules as claimed in claim 11 including in addition a step of using the selected statistically meaningful rules to alter the attribute of interest.

18. A computer implemented method of determining statistically meaningful rules comprising:

providing a database including a plurality of items, each item having a plurality of attributes;

developing a cluster map attribute plane from the plurality of items and the plurality of attributes in the database, the cluster map attribute plane including a plurality of cells each including at least one item, and displaying the cluster map attribute plane, the displayed cluster map attribute plane including a plurality of clusters of items with each item in a cluster having at least one attribute similar to all other items in the cluster;

selecting an attribute of interest and selecting clusters of interest based on a value of the selected attribute;

utilizing rule induction to provide a rule for each cluster of interest;

drawing a line around adjacent items in the cluster map attribute plane for each rule to form at least one complete fenced area in the display including the steps of applying the rules of the clusters of interest to each cell in the cluster map attribute plane in row major order to determine if the cell contains an item that comes within a rule, when a specific cell being processed comes within is a specific rule, applying the specific rule of the clusters of interest to a cell adjacent to the specific cell to determine if the adjacent cell contains an item that comes within the specific rule, if the specific rule does not apply to the adjacent cell, drawing a line between the specific cell and the adjacent cell, and repeating the last three steps until lines are drawn around adjacent cells in the cluster map attribute plane for each selected rule to form complete fenced areas in the cluster map attribute plane;

comparing fenced areas to clusters to separate statistically meaningful rules from statistically meaningless rules or coincidences; and using the selected statistically meaningful rules to alter the attribute of interest.

19. A computer implemented method of determining statistically meaningful rules as claimed in claim 18 wherein the cells in the cluster map attribute plan are arranged in columns and rows and the step of applying the specific defining rule of the selected clusters to a cell adjacent to the specific cell includes applying the specific defining rule of the selected clusters to an adjacent cell in the same row and applying the specific defining rule of the selected clusters to an adjacent cell in an adjacent row.

20. In a computer implemented method of determining statistically meaningful rules, a method of delineating cells defined by a selected rule including the steps of:

providing a database including a plurality of items, each item having a plurality of attributes;

developing a cluster map attribute plane from the plurality of items and the plurality of attributes in the database and displaying the cluster map attribute plane, the cluster map attribute plane including a plurality of cells with each cell including at least one item;

applying a rule of interest to each cell in the cluster map attribute plane to determine if the cell contains an item that comes within the rule;

when a specific cell being processed comes within the specific rule, applying the specific rule of interest to a cell adjacent to the specific cell to determine if the adjacent cell contains an item that comes within the specific rule;

if the specific rule does not apply to the adjacent cell, drawing a line between the specific cell and the adjacent cell; and repeating the last three steps until lines are drawn around adjacent cells in the cluster map attribute plane for the selected rule to form complete fenced areas in the cluster map attribute plane.

* * * * *